US006722086B2

(12) United States Patent
Boots (10) Patent No.: US 6,722,086 B2
(45) Date of Patent: Apr. 20, 2004

(54) MODULAR STRUCTURE SYSTEM

(76) Inventor: Alfred H. Boots, 1113 S. Oak Park, Oak Park, IL (US) 60304

( * ) Notice: Subject to any disclaimer, the term of this patent is extended or adjusted under 35 U.S.C. 154(b) by 24 days.

(21) Appl. No.: 10/005,239

(22) Filed: Dec. 4, 2001

(65) Prior Publication Data
US 2003/0101663 A1 Jun. 5, 2003

(51) Int. Cl.[7] ................................................ E04B 7/08
(52) U.S. Cl. ................ 52/81.3; 52/653.2; 52/DIG. 10; 403/171; 403/176
(58) Field of Search ............................... 52/81.3, 653.2, 52/655.1, 655.2, 656.9, DIG. 10; 403/171, 176, 217, 218, 188, 254, 260

(56) References Cited

U.S. PATENT DOCUMENTS

| | | | |
|---|---|---|---|
| 1,471,520 A | | 10/1923 | McCloy |
| 2,001,215 A | | 5/1935 | Ruppel |
| 3,002,590 A | | 10/1961 | Hannoosh et al. |
| 3,912,410 A | | 10/1975 | Pofferi |
| 3,982,841 A | | 9/1976 | Endzweig |
| 4,012,153 A | | 3/1977 | Pidgeon et al. |
| 4,313,687 A | | 2/1982 | Martinez Apeztegui et al. |
| 4,322,176 A | | 3/1982 | Johnson, Jr. |
| 4,340,318 A | * | 7/1982 | Bush et al. .................. 403/217 |
| 4,355,918 A | | 10/1982 | Van Vliet |
| 4,379,649 A | | 4/1983 | Phillips |
| 4,438,615 A | | 3/1984 | Wendel |
| 4,505,609 A | | 3/1985 | Vella |
| 4,637,193 A | * | 1/1987 | Lange .......................... 52/648 |
| 4,648,734 A | | 3/1987 | Daus, Jr. et al. |
| 4,677,804 A | | 7/1987 | Holt |
| 4,822,199 A | * | 4/1989 | Nehls .......................... 403/171 |
| 4,864,795 A | | 9/1989 | Burg |
| 4,867,596 A | | 9/1989 | Ocuin |
| 4,915,532 A | | 4/1990 | Radclyffe |
| 4,923,322 A | | 5/1990 | Burg |
| 4,932,808 A | | 6/1990 | Bar et al. |
| 5,051,019 A | | 9/1991 | Kohl |
| 5,125,206 A | | 6/1992 | Motohashi et al. |
| 5,127,758 A | * | 7/1992 | Kreusel ....................... 403/171 |
| 5,165,207 A | * | 11/1992 | Oehlke .......................... 52/81 |
| 5,310,273 A | | 5/1994 | Hara |
| 5,356,234 A | | 10/1994 | Vangool |
| 5,568,993 A | | 10/1996 | Potzick |
| 5,640,811 A | | 6/1997 | Boyle et al. |
| 5,651,630 A | | 7/1997 | Nomura |
| 5,700,102 A | | 12/1997 | Feleppa |
| 5,904,437 A | | 5/1999 | Allen |

OTHER PUBLICATIONS

PCT International Search Report dated Mar. 3, 2003.
Guard Rails, Hand Rails and Structural Fittings from McMaster–Carr, Catalog 101, pp. 876–879.
Kee Klamp Slip–on Pipe Fittings and Modular Storage Decking in catalog from Material Flow, Inc., Chicago, Illinois.

* cited by examiner

Primary Examiner—Carl D. Friedman
Assistant Examiner—Naoko Slack
(74) Attorney, Agent, or Firm—Bell, Boyd & Lloyd LLC (57) ABSTRACT

The present invention provides an improved modular system for constructing a tubular structure. The improved system allows the tubing to be assembled and disassembled in a direction perpendicular to a centerline of the tubing without having to move the tubing along its centerline. The improved system allows the tubing to be positioned at various angles. The system also enables curved tubing to be used. In an embodiment, the structural system includes a hub and a connector that removably couples to the hub. The connector has a first end that couples to the hub and a second that defines a notch. One of the walls of the notch connects to a flange that may extend in one or two directions from the centerline of the connector. The connector and flange removably couple to one end of an adapter, which contains a mating notch, wherein the adapter receives a tube.

33 Claims, 9 Drawing Sheets

MODULAR STRUCTURE SYSTEM

BACKGROUND OF THE INVENTION

The present invention relates to structural systems. More particularly, the present invention relates to modular systems for constructing tubular structures.

Certain permanent and semi-permanent free-standing frame members require systems that can be readily assembled and disassembled. The frame members are required to provide a durable and stable structure, be easy to handle and be installable by limited number of persons. The frame members can form a wide variety of shelter frames such as outdoor tents, circus tents, playground equipment, geodesic domes, greenhouses, swimming pool structures, etc. The frame members can also form internal structures, such as furniture, stands, shelving, etc.

One problem with many systems is that telescoping members are required to assemble and disassemble a structure. The telescoping members are costly, complicated and tend to make the structure less rigid or strong. Some systems, for instance, require inner and outer spring loaded tubes and a bolt or clamp that tightens the members together to form a member having a desired length. Other systems require an internal threaded rod or ball screw and an internally threaded member that threads onto the ball screw. When the threaded member is turned, the length of the member shortens or lengthens. Still other systems require a plurality of internal rods having threaded ends connected by a right angle gear and a second mating gear that couples to a handle, which extends outside of the member to enable an operator to turn the handle and thereby turn the rods to lengthen or shorten the member.

Obviously, each of the above systems is more complicated, costly, and heavy than simply using a section of tube. In order to put together and take apart the above systems, the members need to be adjustable. A need therefore exists for a system that allows a structure to be assembled and disassembled without having to move a tubing member along its centerline. The system should optimally take advantage of the relatively low cost and structural stability provided by off the shelf tubing.

There are known systems for releasably interconnecting frames that do not require telescoping. These systems have typically used screw connectors or quick disconnects, which have a number of drawbacks. First, in some systems the connectors or quick disconnects are formed integrally as part of the frame member. Here, the length of the frame members must be carefully machined, which adds to the expense of manufacture. Second, the integral connectors often require more than one person for assembly. Third, many of the connectors are limited to providing only right-angle connections. Such connectors obviously limit the shape and flexibility of the resulting structures.

A need therefore further exists for a system that has non-integral connectors, which do not require precise and expensive machining and tolerances. Further, the system should allow for members to be connected at multiple angles and for curved members.

SUMMARY OF THE INVENTION

The present invention provides an improved modular system for constructing a tubular structure. More specifically, the improved system allows the structural tubing to be assembled and disassembled in a direction perpendicular to a centerline of the tubing without having to move the tubing along its centerline. The improved structural system includes various features and components that allow the structural tubing to be positioned at various angles. The system also enables curved tubing to be used. The present invention therefore provides a flexible, easy to use, light-weight, low-cost and sturdy system that may be adapted to build a multitude of different structures, such as industrial and architectural railings, fencing, shelter frames for outdoor tents, circus tents, playground equipment, geodesic domes, greenhouses, swimming pool structures, etc. The frame members can also form internal structures such as furniture, stands, shelving.

In one preferred embodiment, the structural tubing system includes a hub and at least one connector that removably couples to the hub. The connector has a first end that couples to the hub and a second that defines a notch. One of the walls of the notch removably connects to a flange that extends radially in one or two directions from the centerline of the connector. The connector and the flange removably couple to one end of an adapter, which itself contains a mating notch. The connector and the adapter thereby sandwich the flange. The combined open space of the notches in one preferred embodiment equals the diameter (if circular tubing) or cross-sectional distance (if square or rectangular tubing) of the tubing less the thickness of the internal flange. This creates a uniform diameter or cross-sectional distance across mating pieces of the present invention.

The second end of the adapter is sized and shaped to receive a length of tubing. The flange that extends in either direction from the connector can in turn couple to additional tube receiving adapters. In this way, when multiple connectors are removably connected to the hub, virtually any type of shape can emanate from the hub. The hub, connector, flange and adapter may be modified in a variety of ways as described below to create specialized fittings for specific application, e.g., for curved tubing assemblies or portions of assemblies.

The notch enables an operator to readily bolt and unbolt the adapters and tubes to the connectors and hubs. This way, the operator can translate the adapters and tubes to and from the connectors, flanges and hubs in a direction perpendicular to the centerline of the connector, adapter and tube. A single operator can therefore construct a structure using the modular system of the present invention.

The structures of the present invention are adaptable to be rectilinear or curvilinear and have cross-bracing in three rectilinear and two diagonal planes. The structures are adaptable to be made from standard round, square or rectangular tubing or pipe. The tubing may be aluminum, steel, stainless steel (underwater applications), wood or plastic. The tubing may be any size, e.g., ¾ inch to 4 inches (2 cm to 10.2 cm). The hub, connectors, adapters and tubing are held together by screws and welding for metal and plastic and by dowels biscuits and glue for wood.

It is therefore an advantage of the present invention to provide a modular structure system that is easy to use.

Further, it is an advantage of the present invention to provide a modular structure system that does not require telescoping members.

Moreover, it is an advantage of the present invention to provide a modular structure system that is readily assembled and disassembled.

It is another advantage of the present invention to provide a modular structure system that is light-weight.

It is a further advantage of the present invention to provide a modular structure system that is adaptable to be made of many different types of materials.

It is still another advantage of the present invention to provide a modular structure system that is low-cost.

It is still a further advantage of the present invention to provide a modular structure system that is sturdy.

Still further, it is an advantage of the present invention to provide a modular structure system that may be used to construct a variety of two dimensional and three dimensional structures.

Additional features and advantages of the present invention are described in, and will be apparent from, the following Detailed Description of the Invention and the figures.

DETAILED DESCRIPTION OF THE INVENTION

Figure 1:
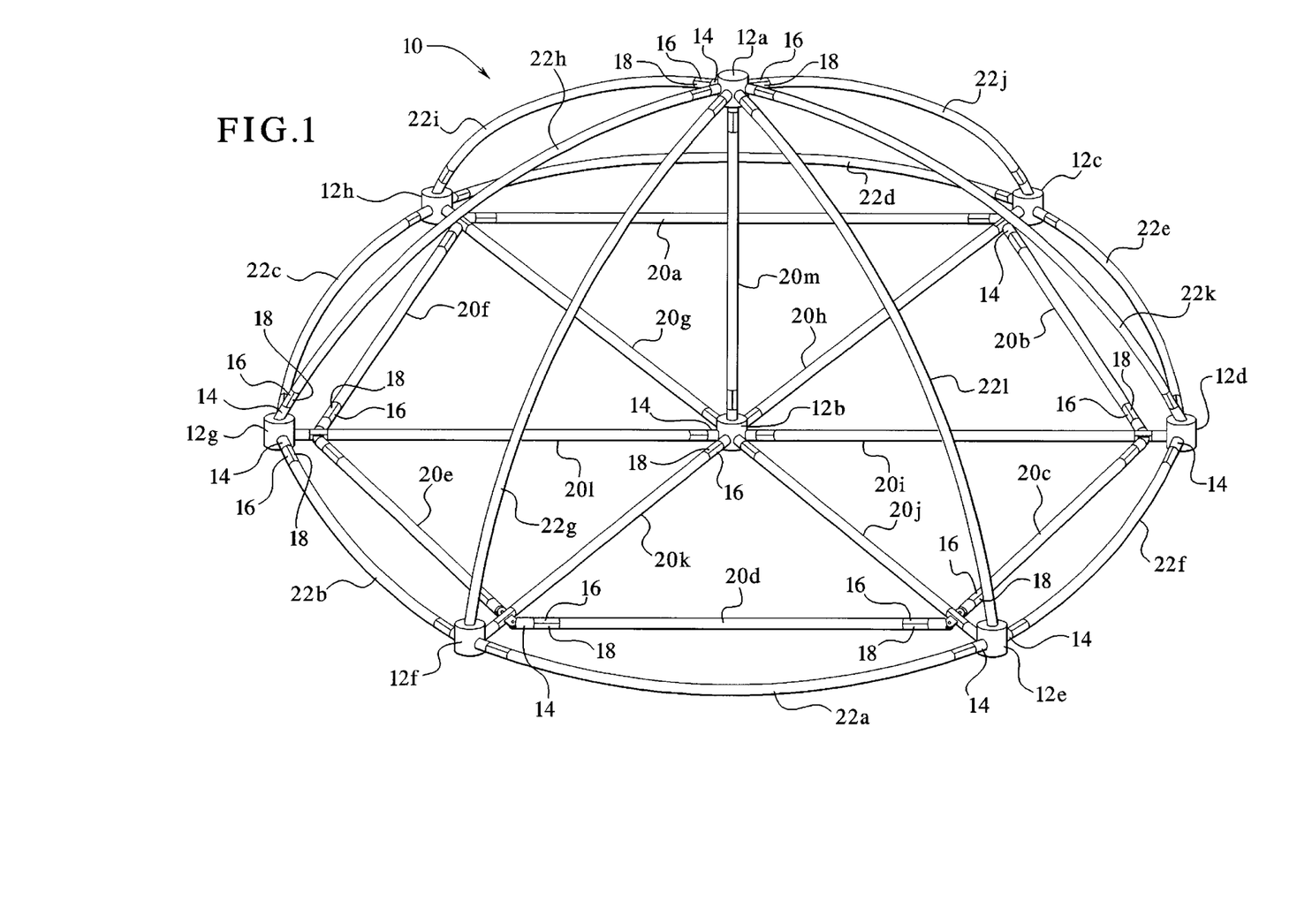
FIG. 1 is a perspective view of one possible structure that can be made from the modular structure system of the present invention.

Referring now to the drawings and in particular to FIG. 1, one implementation of the modular structure system of the present invention is illustrated by the assembly 10. The assembly 10 includes a plurality of hubs or nodes 12a to 12h (collectively referred to herein as hubs 12). The hubs 12 as illustrated each removably connect to a plurality of first members or connectors 14. The hubs 12 can removably connect to a single connector or, in various embodiments, removably connect to up to four, six, eight, ten, twelve or more connectors 14. For example, the hubs 12a and 12b are shown connecting to six connectors. The hubs 12c to 12h are each shown connecting to three connectors.

The mounting holes or attachment mechanisms in the hub 12 for removably attaching the connectors 14 are in a preferred embodiment evenly spaced apart around a circular side wall of the hub. It should be appreciated that to form an equilateral triangular structure, hubs 12 having six attachment mechanisms that are spaced apart equally sixty degrees are used. If the hubs 12 contain eight evenly spaced attachment mechanisms, the angular spacing could be forty-five and/or ninety degrees and thus a right angle lattice or structure could be made with cross-braces at forty-five degrees. Obviously, the spacing of the attachment mechanisms about the hub 12 can vary to suit the particular need of the builder or operator. In an alternative embodiment, the attachment mechanisms are unequally spaced apart.

As will be shown in more detail below, the connectors 14, which attach to and extend from the hubs 12 define notches or grooves. The notches or grooves of the connectors 14 each attach to a flange 16. The flanges 16 in one embodiment terminate and are flush with the connectors. The flanges in another embodiment extend from one or more surfaces of the connectors 14, so that other structural members may be mounted to the flanges and extend perpendicularly from the connectors 14.

The connectors 14 and the flanges 16 further removably connect to an adapter 18. The adapter 18 has one notched end that attaches to the flange 16 and one end that receives one of the straight tubes 20a to 20m (collectively referred to herein as straight tubes 20) or one of the curved tubes 22a to 22l (collectively referred to herein as curved tubes 22). In one preferred embodiment, the end of the adapter 18 that receives the tube is sized and shaped to fit snuggly inside of a round or square tube 20 or 22. Alternatively, the end of the adapter 18 may be adapted to fit snuggly outside of a hollow tube or solid rod. It should be appreciated that the present invention may use square, rectangular and round tubes and square, rectangular and round solid members. The tubes or members may be straight or curved. These are collectively referred to herein as "tubes" 20 or 22.

The assembly 10 of FIG. 1 has a dome shape. This shape is formed using eight hubs 12a to 12h; a multitude of connectors 14, at various angles, removably attached to each of the hubs; a flange 16 for each of the connectors 14; and an adapter 18 for each of the connectors 14 and flanges 16. One end of the adapter 18 connects to a flange 16 and another end receives a straight tube 20 or a curved tube 22. The straight tubes 20a to 20m in the assembly 10 provide structural support or cross-bracing. The horizontally disposed curved or curvilinear tubes 22a to 22f extend around and form the horizontal circular base of the dome assembly 10. The vertically disposed curved or curvilinear tubes 22g to 22l extend vertically from the horizontal circular base to the node 12a to form the dome shape of the dome assembly 10. Obviously, the straight tubes 20 or a combination of straight tubes 20 and curved tubes 22 can be used to form a multitude of assembly shapes.

The vertically disposed curved tubes 22g to 22l extend in one embodiment via vertically curved adapters 18 that removably connect to vertically curved flanges 16. The flanges 16 curve inward upwardly from the hubs 12c to 12h of the horizontal circular base. The horizontally disposed curved tubes 22a to 22f extend via horizontally curved adapters 18 that removably connect to horizontally curved flanges 16. The flanges also connect to the connectors 14, which in turn connect to the hubs 12.

The straight tubes 20g to 20l that form spokes in the horizontal circular base extend from a hub 12 to the hub 12b. The straight tubes 20a to 20f that form the cross-members between the spokes extend from a connector 14 to another connector 14. It should therefore be appreciated that the present invention enables curved or straight tubes to connect with either two of or one of each of the connectors 14 and/or the hubs 12. It should further be appreciated that the tubes 20 and 22 may extend in at least two directions from either the connectors 14 or the hub 12.

The hubs 12a and 12b at the center of the dome assembly 10 are each fitted with six radial attachment mechanisms spaced evenly apart sixty degrees. Here, each of the six radial attachment mechanisms of the hubs 12a and 12b attaches to a radially extending connector 14. The connectors attached to the hubs 12a and 12b are spaced apart evenly sixty degrees. Each of the connectors 14 attached to hubs 12a and 12b removably attaches to a flange 16, which has ends that terminate flushly with a respective connector 14. The connectors 14 and the flanges 16 each in turn connect to one end of an adapter 18. The other ends of the adapters 18 fit snuggly inside of the upper end of the curvilinear tubes 22g to 22l for the hub 12a and straight tubes 20g to 20l (for the hub 12b). As will be shown below, suitable attachment mechanisms such as bolts, etc., are used to removably and fixedly attach the tubes 20 and 22 to the adapters 18.

Each component of the assembly 10 and each of the other components disclosed herein is adaptable to be made from any of a plurality of different materials including metal, wood and plastic. If metal, the hubs 12, connectors 14, flanges 16, adapters 18 and tube sections 20 and 22 may be aluminum, steel, stainless steel, copper or of any suitable alloy. If plastic, the parts may be of any suitable plastic known to those of skill in the art. The parts may further be wooden and be attached via a suitable glue or by a wood attachment mechanism, such as dowels, biscuits and/or screws. Different components of a particular assembly may be made from different materials.

Figure 2A:
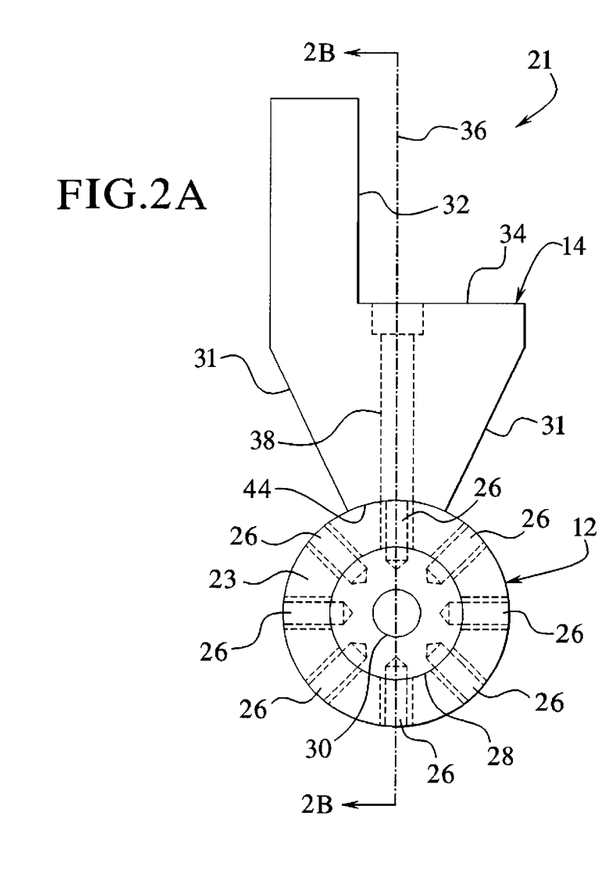
FIGS. 2A and 2B illustrate one embodiment of a hub and connector subassembly of the present invention.
Figure 2B:
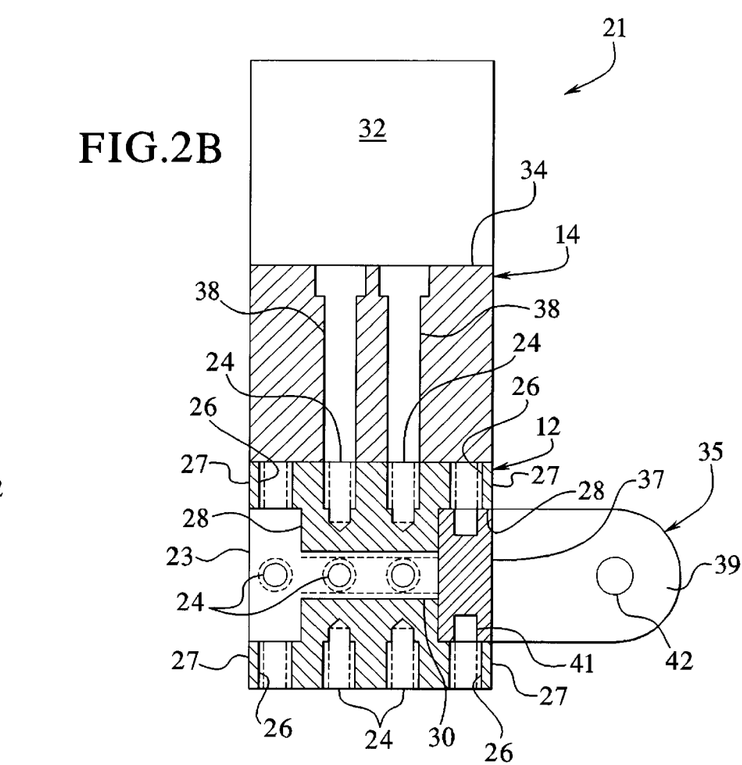

Referring now to FIGS. 2A and 2B, a sub-assembly 21 shows a hub 12 connected to a connector 14. The sub-assembly 21 of the hub 12 and the connector 14 is an enlarged view of one of the hub/connector sub-assemblies shown in FIG. 1. FIG. 2A is a top view of the hub 12 and connector 14. FIG. 2B is a cross-section taken through the line 2B—2B of the sub-assembly 21 shown in FIG. 2A. In FIG. 2A, eight mounting holes 26 are shown spaced equally about the circular hub 12. The angle created between the evenly spaced mounting holes 26 is therefore forty-five degrees. While a circular hub 12 is preferred, it should be appreciated that the hub could have other cross-sectional shapes, such as a triangle, a square, a hexagon, or an octagon.

The cross-section of FIG. 2B illustrates that there are inner mounting holes 24 that receive screws or bolts, wherein the screws or bolts removably connect the connector 14 to the hub 12. In one embodiment the mounting holes 24 are blind holes, i.e., do not extend all the way through the hub 12, and are therefore tapped at a desired thread pitch. In another embodiment, the mounting holes 24 could extend through the hub 12 so that a screw holding the connector 14 to the hub 12 could pass all the way through the hub 12 and receive a nut.

As illustrated, two screws removably connect the connector 14 to the hub 12. Using at least two screws ensures that the connector 14 will not rotate with respect to the hub 12 after attachment. Also, as illustrated in FIG. 2A, the connector 14 has a curved face 44 that abuts the circular surface of the hub 12. This further ensures that the connector 14 firmly attaches to the hub 12.

The connector 14 is shown having two sloped walls 31, which enable a plurality of connectors 14 to mount to the outer circular surface of the hub 12. It should be appreciated that the necessary slope of the sloped walls 31 depends upon the maximum number of connectors 14 that may be mounted to the hub 12. The necessary slope of the sloped walls 31 also depends upon the width of the connector 14.

The connector 14 defines a notch having a parallel wall 32 and a perpendicular wall 34. The parallel wall 32 runs parallel to a plane 36, which bisects the connector 14 and the hub 12. The perpendicular wall 34 is perpendicular to the plane 36. A plurality of mounting holes 38 run from the curved face 44 through the connector 14 and out the parallel wall 34, so that a plurality of screws may be inserted through the perpendicular wall 34.

The flanges 16 described above in FIG. 1 attach to the parallel wall 32. The orientation of the notch defined by the walls 32 and 34 enables the flange 16 attached to the parallel wall 32 to extend outwardly from the connector 14 a distance perpendicular to the flat ends 23 of the hub 12, a distance parallel to the flat ends 23 of the hub 12 or at any desired angle, e.g., thirty, forty-five or sixty degrees relative to the flat ends 23.

As shown in FIG. 2A, a flange 16 attached to the wall 32 would extend from the connector 14 in a direction perpendicular to the flat ends of the hub 12. If the notch were instead rotated ninety degrees about the connector 14, the flange 16 attached to the wall 32 would extend from the connector 14 in a direction parallel to the flat ends of the hub 12. It should be appreciated therefore that the flanges 16 may extend from the connector 14 in the same or different directions as do flanges 16 mounted to other connectors 14 that are attached to the hub 12. Also the orientation of the notch enables structural tubes 20 or 22 to extend from the hub 12 in two or three dimensions. The orientation of the notch also determines whether a structural member or tube 20 or 22 rotates in a plane perpendicular to the flat end 23 of the hub 12 or in a plane parallel to the flat face of the hub 12.

The hub 12 also defines outer mounting holes 26 which enable a screw to pass through a wall 27 and enter a larger end-hole 28. The outer mounting holes 26 may or may not be tapped. FIG. 2B illustrates that the hub 12 defines two end-holes 28. The end-holes 28 are blind holes, which individually enable an end-flange 35 to sit in the blind hole 28. The end-flange 35 defines at least one and preferably a plurality of mounting holes 41 on a circular portion 37 of the end-flange 35. In an embodiment, the mounting holes 41 are tapped at a desired thread pitch to receive a screw or bolt. The mounting holes 41 receive a screw or bolt through the outer mounting holes 26, which are not tapped in this embodiment. A flat portion 39 perpendicularly attaches to or is formed integrally with the circular portion 37 of the end-flange 35. The end-flange 35 enables an adapter 18 to mount to a hole 42 defined by a flat portion 39 The hub 12 also defines a through-hole 30 which links the blind end-holes 28. The through-hole 30 enables a screw or bolt to pass through the flat ends 23 of the hub 12. In an alternative embodiment from the one illustrated, the circular portion 37 of the end-flange 35 may be adapted to define a tapped hole on its bottom surface that receives a screw through the through-hole 30 from the opposing flat end 23 of the hub 12.

A straight tube 20 or curved tube 22 attaches to an adapter 18 that couples to the end-flange 35. An end-flange 35 may be used for example to attach the vertical member 20m to the flat ends 23 of the hubs 12a and 12b of FIG. 1. Or, the end-flange 35 may be used to attach the vertically curved members 22g through 22l to the tops of the hubs 12f clockwise to 12e, respectively. With respect to the curved tubes 22g to 22l, the portion 39 of the end-flange 35 may be bent or curved so as to engage a curved flange 16 and a curved adapter 18 (see FIGS. 5A and 5B). It should be appreciated from the foregoing discussion, the hub or node 12 may form a plurality of connecting points about its circular surface and form one or two connecting points on its flat ends 23. It should therefore be appreciated that up to ten members may extend from the hub 12 shown in FIGS. 2A and 2B, eight connectors 14 and two end-flanges 35.

Figure 2C:
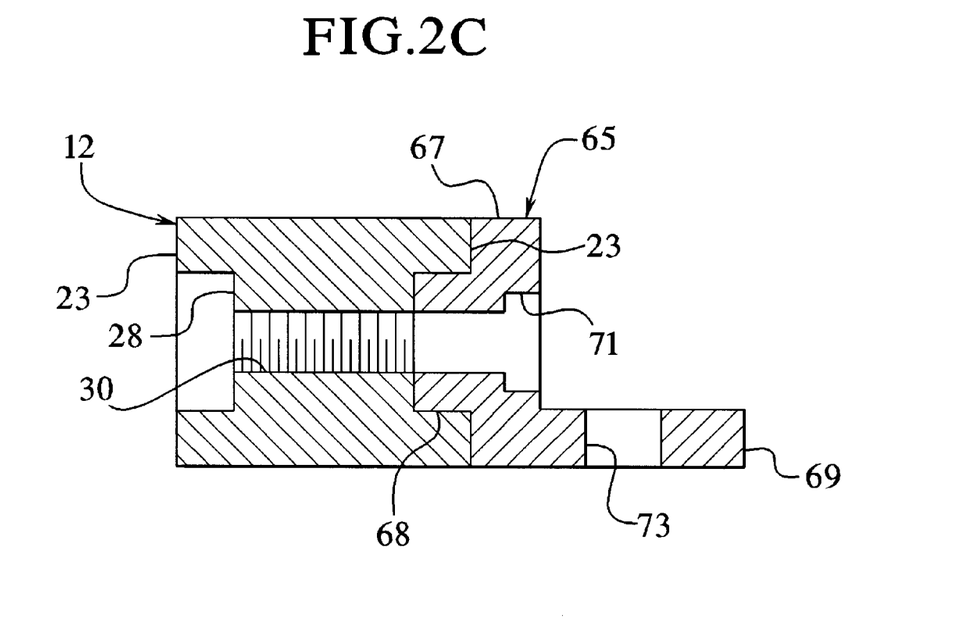
FIGS. 2C and 2D illustrate alternative embodiments of end-flanges of the present invention.
Figure 2D:
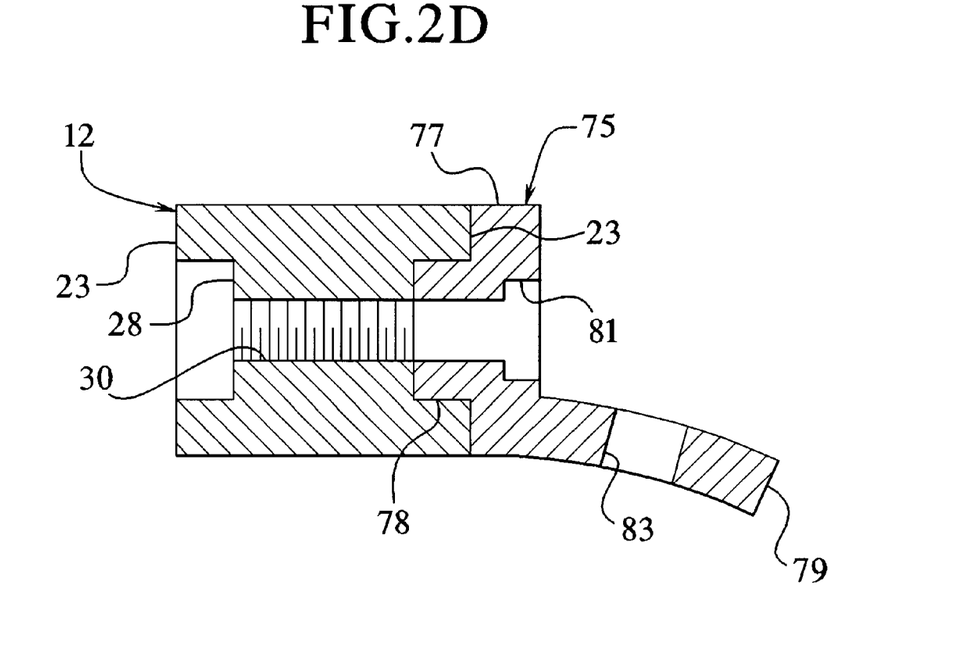

Referring now to FIGS. 2C and 2D, alternative end-flanges 65 and 75 are shown respectively. The end-flange 65 of FIG. 2C includes a circular portion 67 (shown in cross-section) that removably attaches to a flat end 23 of the of a hub 12. The circular portion 67 defines an extension 68 that fits into one of the end-holes 28 of the hub 12. The circular portion 67 and extension 68 define a mounting hole 71 that enables the end-flange 65 to mount to the hub. The mounting hole 71 receives a screw or bolt and in a preferred embodiment includes a counterbore so that the screw head or bolt head sinks underneath the surface of the end-flange 65. The through-hole 30 of the hub 12 in this embodiment is tapped and adapted to receive the screw or bolt through the mounting hole 71.

The end-flange 65 of FIG. 2C also includes a flat portion 69. The flat portion 69 perpendicularly attaches to or is formed integrally with the circular portion 67 of the end-flange 65. The flat portion 69 defines a hole 73 that enables an adapter 18 to mount to the flat portion 69. Since the flat portion 69 is straight, the end-flange 65 may be used for example to attach the vertical member 20m to the flat ends 23 of the hubs 12a and 12b of FIG. 1.

The end-flange 75 of FIG. 2D is similar to the end-flange 65 of FIG. 2C. That is, the end-flange 75 includes a circular portion 77 (shown in cross-section) that removably attaches to a flat end 23 of the of a hub 12. The circular portion 77 defines an extension 78 that fits into one of the end-holes 28 of the hub 12. The circular portion 77 and extension 78 define a mounting hole 81 that enables the end-flange 75 to mount to the hub. The mounting hole 81 receives a screw or bolt and in a preferred embodiment includes a counterbore so that the screw head or bolt head sinks underneath the surface of the end-flange 75. The through-hole 30 is once again tapped and adapted to receive the screw or bolt through the mounting hole 81.

The end-flange 75, unlike the end-flanges 65, includes a curved portion 79. The curved portion 79 attaches to or is formed integrally with the circular portion 77 of the end-flange 75. The curved portion 79 defines a hole 83 that enables a curved adapter 18 (FIGS. 5A and 5B) to mount to the curved portion 79. Since the portion 79 is curved, the end-flange 75 may be used for example to attach the vertically curved members 22g to 22l to the tops of the hubs 12f clockwise to 12e, respectively.

Figure 3A:
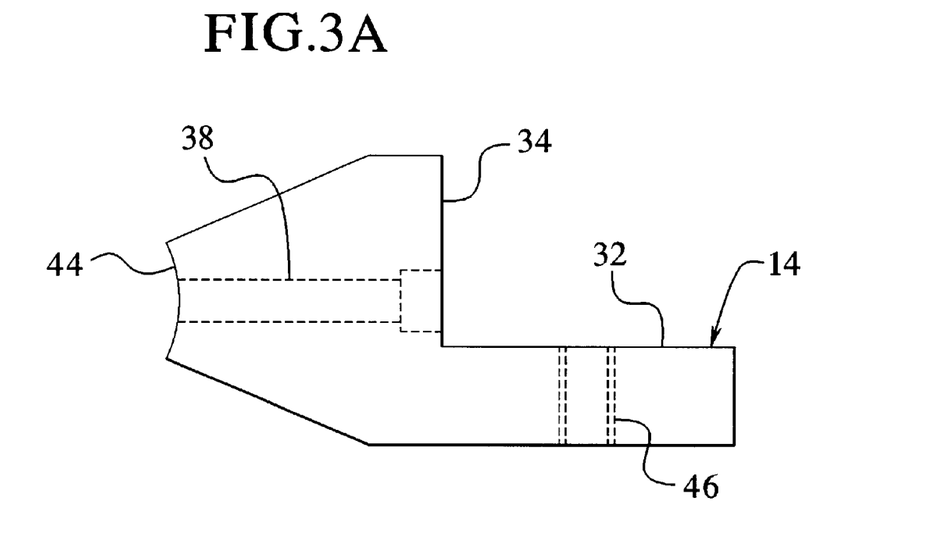
FIGS. 3A and 3B illustrate one embodiment of a connector of the present invention.
Figure 3B:
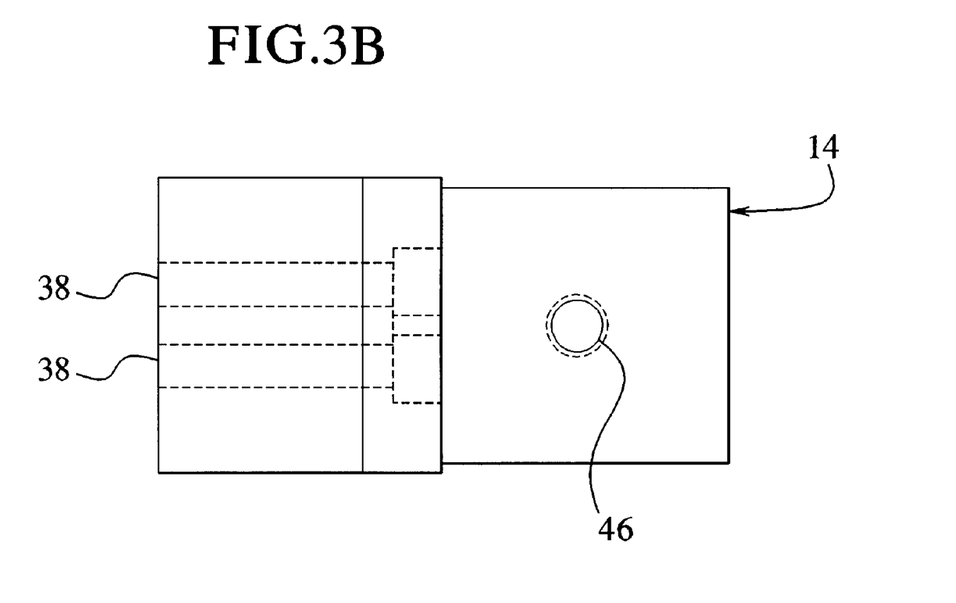

Referring now to FIGS. 3A and 3B, different views of one embodiment of the connector 14 are illustrated. FIG. 3A shows a front view of the connector 14 having the curved surface 44 which abuts the circular surface of the hub 12. FIG. 3B is a top view of the connector 14 in FIG. 3A showing an additional hole 46 which allows a flange 16 and accompanying adapter 18 to rotatably connect to the connector 14.

In FIGS. 3A and 3B, the orientation of the notch as defined by the walls 32 and 34, wherein the flange 16 mounts via the hole 46 in the wall 32, dictates that a rotatable flange 16 and adapter 18 connected to the connector 14 via the mounting hole 46 would rotate into and out of the page of FIG. 3A. The flange 16 and adapter 18 would thus rotate in a plane perpendicular to the flat end 23 of the hub 12. A straight tube 20 or a curved tube 22 could therefore be coupled to the connector 14/flange 16/adapter 18 at multiple angles relative to the flat end 23 of the hub 12.

As stated above, the parallel wall 32 can be rotated relative to the flat end 23 to create a rotation plane at any desirable angle relative to the flat end 23. The mounting hole 46 may be tapped to receive the threads of a screw or may otherwise be a through-hole through which a screw would extend to receive a nut on the outside of the connector 14. The connector 14 is used to attach the radially extending members shown in FIG. 1, i.e., the members extending radially from hubs 12a to 12f and the cross-braces 20a to 20f extending respectively from the straight tubes 20g to 20l.

Figure 4A:
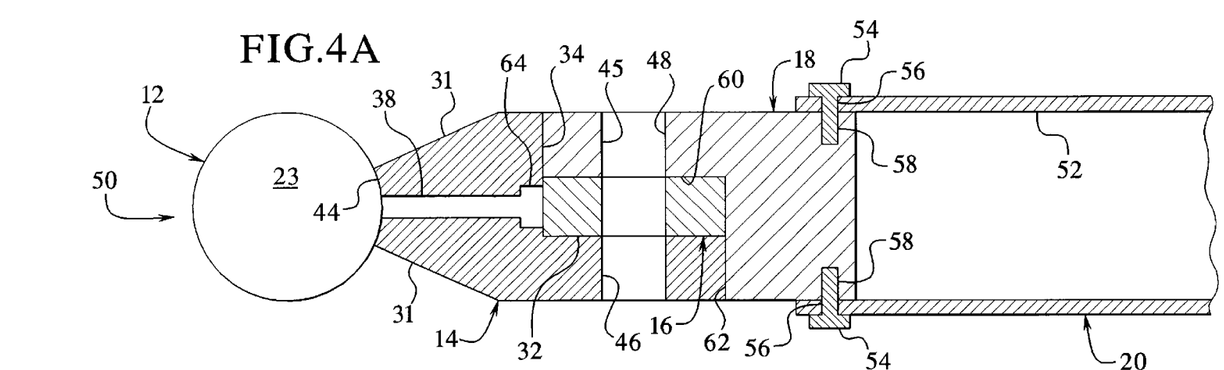
FIGS. 4A and 4B illustrate one embodiment of a sub-assembly of the present invention having a hub, connector, flange, adapter and straight tube.
Figure 4B:
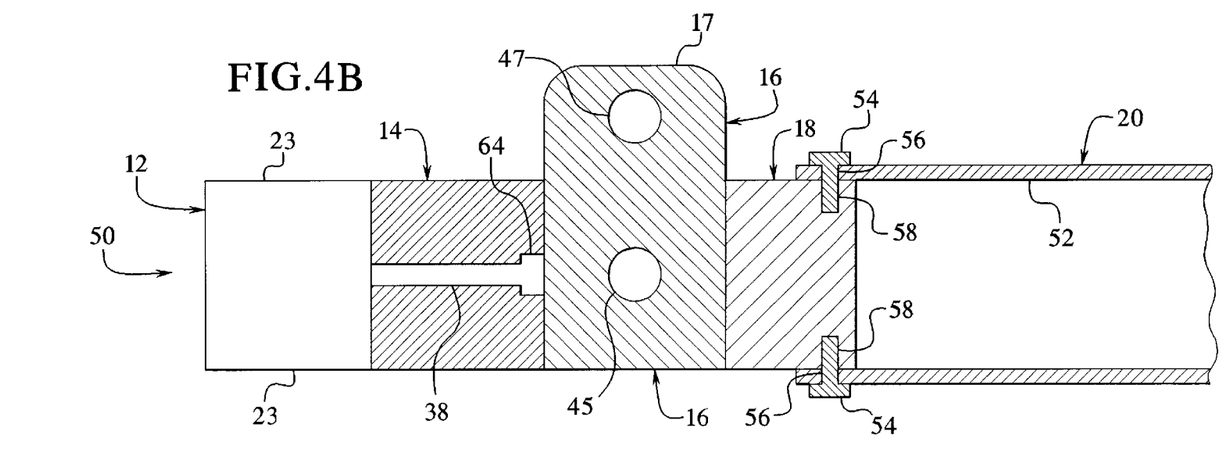

Referring now to FIGS. 4A and 4B, two views of a sub-assembly 50 are illustrated. The sub-assembly 50 includes the hub 12 which is figuratively shown having the flat ends 23. Each of FIGS. 4A and 4B also shows a cross-section of the connector 14, the flange 16 connected to the connector 14, and the adapter 18 connected to the flange 16 and the connector 14. One end of the adapter 18 in each of FIGS. 4A and 4B receives a straight tube 20.

FIGS. 4A and 4B illustrate the relationship between the connector 14, the flange 16, the adapter 18, and the tube 20. The connector 14 and the adapter 18 mount on either side of the flange 16 as illustrated in FIG. 4A. The mounting hole 46 of the connector aligns with a mounting hole 45 of the flange 16 and these two holes align with a hole 48 defined by the adapter 18. A screw or bolt is inserted through all three holes and receives a nut or lock nut on the opposing side of the screw or bolt to thereby clamp the connector 14, the flange 16 and the adapter 18 together.

In an alternative embodiment, either the connector 14 or the adapter 18 may have a tapped hole, which would receive the screw to thereby clamp the three members together. It should be appreciated from FIGS. 4A and 4B that the geometry of the connector 14 and the adapter 18 do not allow the flange 16 to rotate even though the flange is held to the connector and the adapter by one screw. However, if the adapter 18 is configured with rounded edges, the adapter 18 can rotate relative to the hub 12, the connector 14 and the flange 16.

FIG. 4B illustrates that one end 17 of the flange 16 extends from the substantially uniform surface created by the constituents of the sub-assembly 50. The portion or end 17 of the flange 16 that extends from the sub-assembly 50 defines a hole 47 which in turn enables another adapter 18 coupling to another straight tube 20 or curved tube 22 extending therefrom to attach to the extended portion 17 of the flange 16. Again, the second adapter 18 may be adapted to rotate relative to the fixed portion 17 of the flange 16.

Although FIG. 4B illustrates a portion extending from one surface of the subassembly 50, it should be appreciated that the flange 16 could alternatively extend from neither surface, in which case the sub-assembly 50 maintains a substantially uniform diameter or cross-sectional shape, or dual portions 17 of the flange 16 could extend from opposing surfaces of the sub-assembly 50. A flange 16 having dual portions 17 would be used for example to connect the cross-braces 20a to 20f of FIG. 1 to connectors 14 attaching the straight tubes 20g to 20l to the hubs 12h clockwise to 12g, respectively.

The straight tube 20 in a preferred embodiment is a hollow tube having an inner surface 52 that slidingly engages the outer surface of the adapter 18. Once the inner surface 52 slides a sufficient distance over the adapter 18, the mating surfaces may be permanently welded or crimped or, as illustrated, removably fixed by one or more bolts 54 inserted through the through-holes 56 defined by the straight tube 20 and threaded into threaded holes 58 defined by the adapter 18. Obviously, a curved tube 22 could be similarly attached to the adapter 18 instead of the illustrated straight tube 20.

In one preferred embodiment, the sloped walls 31 are milled into or otherwise formed into the connector 14 which is round in cross-section. The adapter 18 also in the preferred embodiment has a circular cross-section, which is of the same diameter as that of the connector 14. The adapter 18 as illustrated also includes a notch having a parallel wall 60 which is parallel to and opposes the parallel wall 32 of the connector 14. The notch of the adapter 18 also includes a perpendicular wall 62 which is parallel to and opposes the perpendicular wall 34 of the connector 14. The through-hole 38 defined by the connector 14 is also shown having a counterbore 64. The counterbore 64 enables a screw to fasten the connector 14 to the hub 12, wherein the screw has a head that sits beneath the perpendicular wall 34 of the connector 14, so that the flange 16 may couple to the connector 14 without having interference from the screw holding the connector 14 to the hub 12. Thus it should be appreciated that the sub-assembly 50, which could be used to attach any of the radially, e.g., horizontally extending members of FIG. 1, can be easily disassembled via the connector 14, flange 16, adapter 18 interface without having to first remove an attached straight tube 20 or curved tube 22.

Figure 5A:
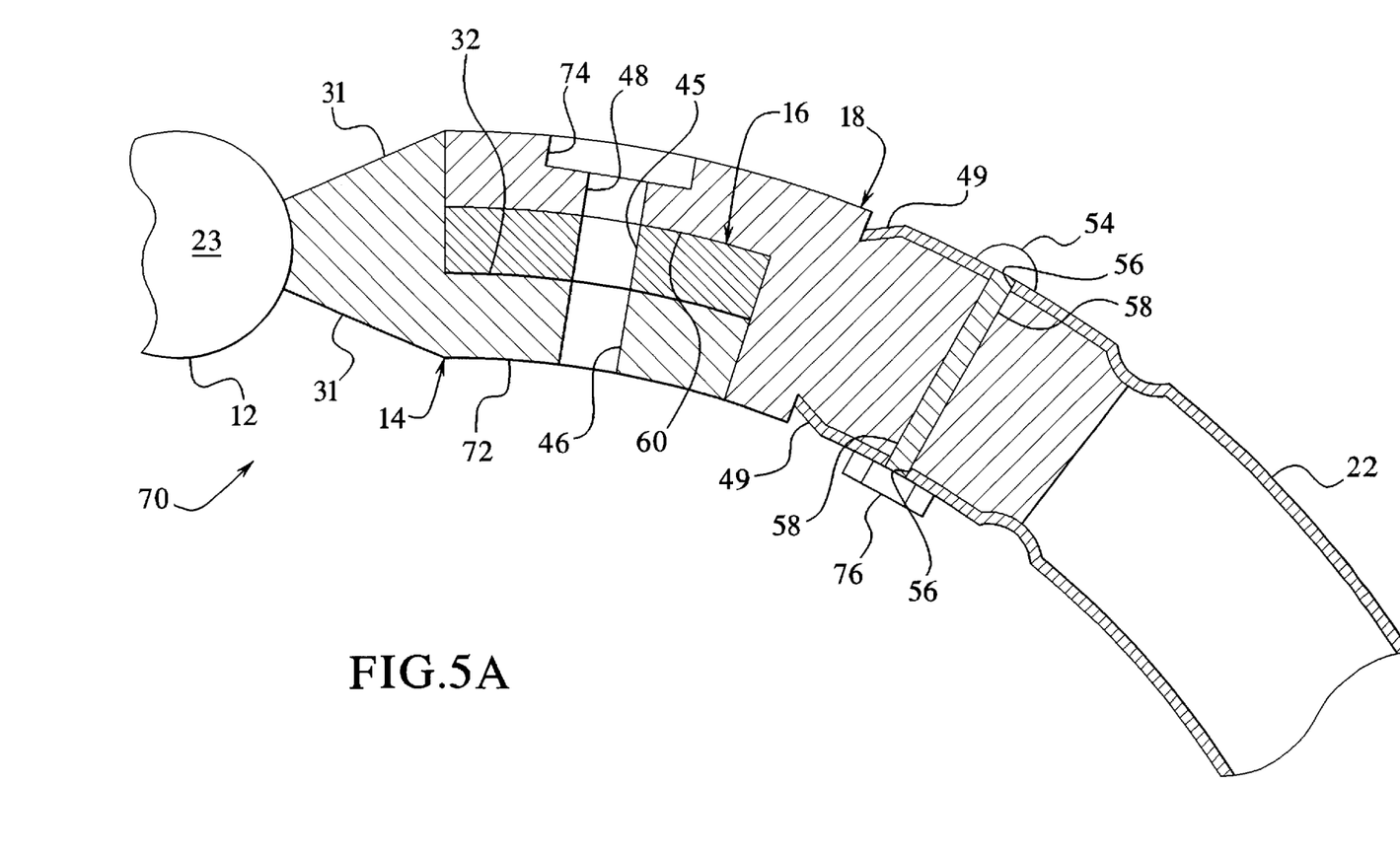
FIG. 5A illustrates another embodiment of a sub-assembly of the present invention having a hub, connector, flange, adapter and a horizontally disposed curved tube.

Referring now to FIG. 5A, a sub-assembly 70 contains a number of differences from the sub-assembly 50 illustrated with respect to FIGS. 4A and 4B. The most obvious difference is that the sub-assembly 70 in general is curved, whereas the sub-assembly 50 is straight. The sub-assembly 70 is used in a horizontal curvature situation illustrated for example in FIG. 1 by the curved tubes 22a through 22f connecting to the circular portions of the hubs 12f clockwise to 12e, respectively. For reference, the flat end 23 of the hub 12 of FIG. 5A is illustrated as disposed in relation to the horizontally curved tube 22.

Even though the sub-assembly 50 could also include a horizontally curved tube 22, which the sub-assembly 70 includes, the sub-assembly 70 begins the curve with the connector 14. The connector 14 includes the curved portion 72, which defines the through-hole or tapped hole 46 and also defines a curved parallel wall 32. The curved parallel wall 32 mates with the flange 16, which is likewise curved. The parallel wall 60 of the adapter 18 is also curved and mates with the curved flange 16.

The adapter 18 also includes a counterbore 74, which allows a screw to countersink into the curved adapter 18 and connect the curved flange 16 and the curved connector 14 to the adapter 18. In an alternative embodiment, the connector 14 may be adapted to include a counterbore, such as the counterbore 74, wherein the screw connecting the members would insert from the opposite direction.

The adapter 18 of the assembly 70 of FIG. 5A also differs from the adapter 18 of the assembly 50 in that it includes indentations 49 that allow the curved tube 22 to be welded or crimped onto the adapter 18. The indentations 49 are milled or otherwise formed integrally with the adapter 18. The adapter 18 defines a hole 58 that, in the assembly 70, is a through-hole. A screw 54 inserts through the curved tube 22 and the adapter 18, whereby a nut 76 threads onto the screw 54. The through-hole 58 of the adapter 18 aligns with through-holes 56 of the curved tube 22.

The horizontally disposed curved tube 22 is bent into any desired radius. In FIG. 1, the horizontally disposed bent tubes 22a to 22f are bent so that they mate with the hubs 12f clockwise to 12e respectively to form the circular base. The tubes 22a to 22f approach the hubs 12f clockwise to 12e from a horizontal direction. The curved assembly 70 enables the curvature to begin at a point closer to the hub 12 than does the assembly 50.

Figure 5B:
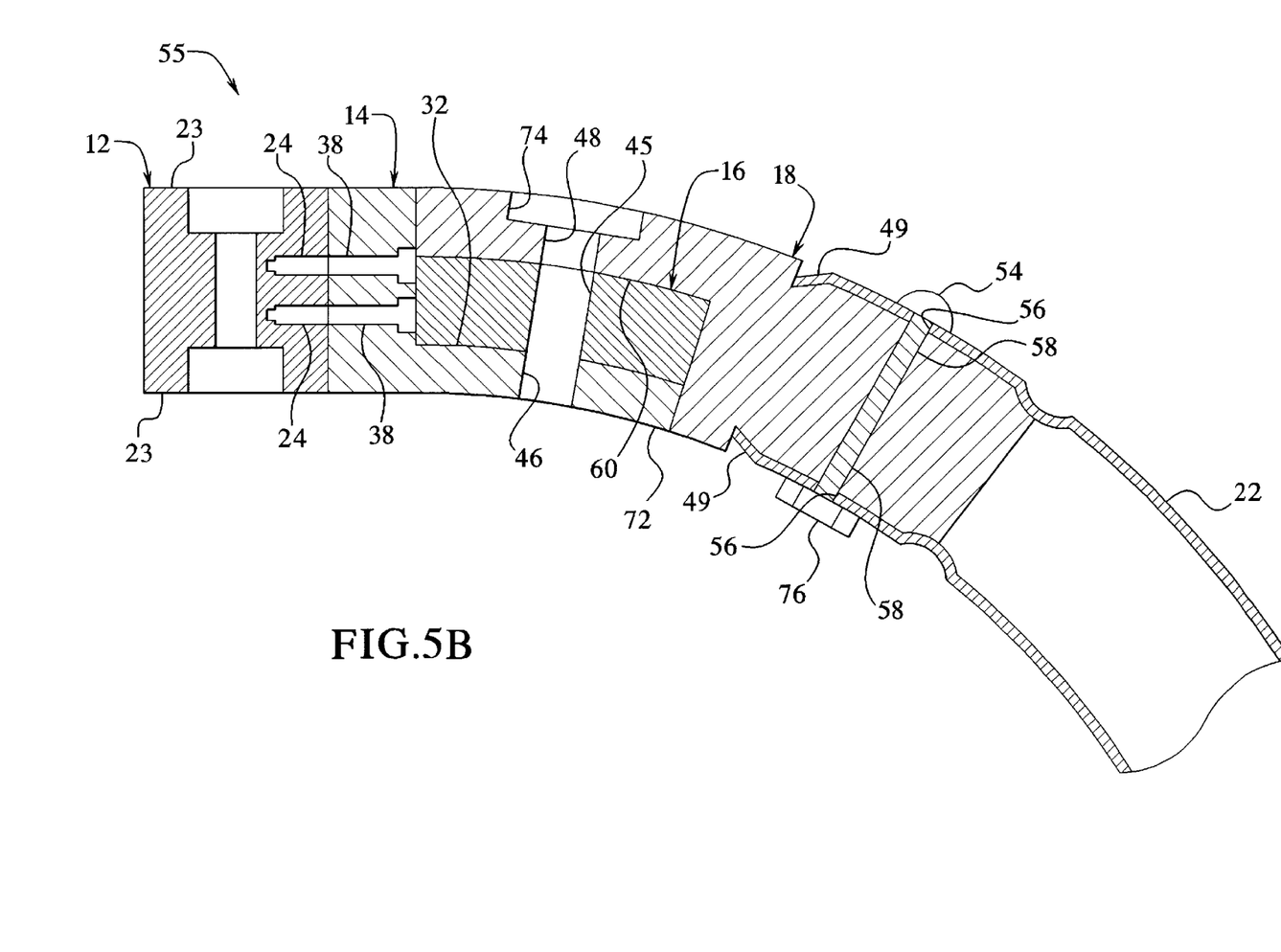
FIG. 5B illustrates a further embodiment of a sub-assembly of the present invention having a hub, connector, flange, adapter and a vertically disposed curved tube.

Referring now to FIG. 5B, a sub-assembly 55 is used in a vertical curvature situation illustrated for example in FIG. 1 by the curved tubes 22g through 22l connecting to the circular portion of the hub 12a. That is, the vertical sub-assembly 55 is used when tubes extend radially away from a hub, e.g., hub 12a, and bend vertically up or down. For reference, the flat end 23 of the hub 12 of FIG. 5B is illustrated disposed in relation to the vertical curvature of the bent tube 22.

Even though the sub-assembly 50 of FIG. 4 could also include a vertically curved tube 22, which the sub-assembly 55 includes, the sub-assembly 55 begins the curve with the connector 14. The connector 14 includes the curved portion 72, which defines the through-hole or tapped hole 46 and also defines a curved parallel wall 32. The curved parallel wall 32 mates with the flange 16, which is likewise curved. The parallel wall 60 of the adapter 18 is also curved and mates with the curved flange 16.

The adapter 18 also includes a counterbore 74, which allows a screw to countersink into the curved adapter 18 and connect the curved flange 16 and the curved connector 14 to the adapter 18. In an alternative embodiment, the connector 14 may be adapted to include a counterbore, such as the counterbore 74, wherein the screw connecting the members would insert from the opposite direction.

The adapter 18 of the assembly 55 of FIG. 5B again includes indentations that allow the vertically curved tube 22 to be welded or crimped onto the adapter 18. The adapter 18 defines a hole 58 that, in the assembly 55, is a through-hole. A screw 54 inserts through the tube 22 and the adapter 18, whereby a nut 76 threads onto the screw 54. The through-hole 58 of the adapter 18 aligns with through-holes 56 of the curved tube 22.

The vertically disposed curved tubes 22 are bent into any desired radius. In FIG. 1, the vertically disposed bent tubes 22g to 22l are bent so that they radially mate at the single node or hub 12a. The tubes 22g to 22l approach the hub 12a from a vertical direction and bend horizontally to radially meet the rounded side of the hub 12a. The vertically curved assembly 55 enables the curvature to begin at a point closer to the hub 12 than does the assembly 50 of FIG. 4. Accordingly, the through-holes 38 of the connector 14 align with the inner tapped holes 24 of the hub 12.

Figure 6A:
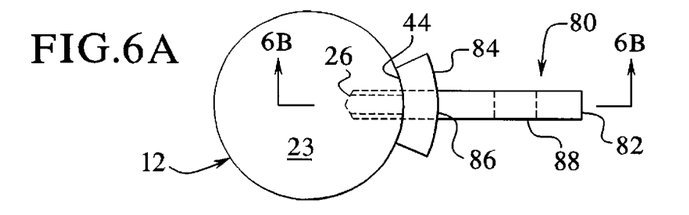
FIGS. 6A and 6B illustrate another embodiment of a connector of the present invention.
Figure 6B:
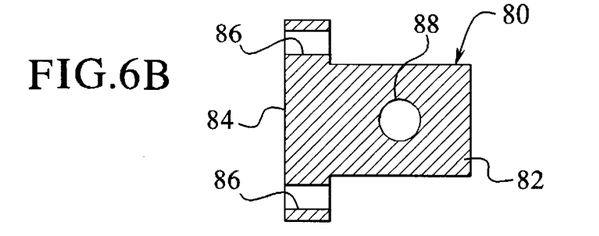

Referring now to FIGS. 6A and 6B, an alternative connector 80 of the present invention is illustrated. FIG. 6B is a cross section of FIG. 6A taken through the line 6B—6B. For reference, the hub 12 having the flat end 23 is shown connected to the alternative connector 80 in FIG. 6A.

The alternative connector 80 includes a leg 82 and a mounting portion 84. The leg 82 extends radially from the hub 12 and has a thickness that defines a hole 88. The mounting portion 84 in one preferred embodiment has a curved surface 44 that is curved to match the curvature of the hub 12. Obviously, if the hub 12 is not circular as shown, the mounting portion 84 need not be curved. The mounting portion 84 defines a plurality of mounting holes 86. The mounting holes 86 enable the alternative connector 80 to be removeably fixed to the hub 12 via the outer tapped holes 26 in the hub 12 discussed above in connection with FIGS. 2A and 2B.

As illustrated in more detail below, the alternative connector 80 enables an adapter 18 to directly connect to the connector 80 without the need for an intermediate flange. As further illustrated below, an alternative flange is adaptable to mount to one side of the alternative connector 80, while the adapter 18 mounts to the opposing side of the alternative connector 80. The alternative connector 80 may be used, for example, to couple to any of the horizontally disposed straight tubes 20a to 20l. In an alternative embodiment, the leg 82 may be bent and thereby couple any of the radially connected members to hubs 12a to 12h.

Figure 7A:
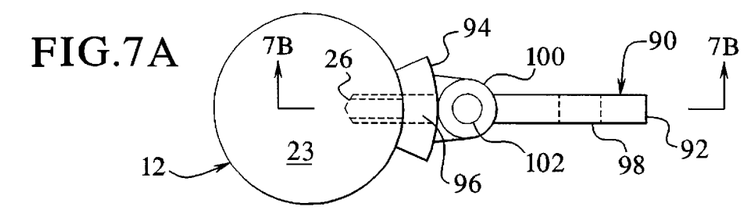
FIGS. 7A and 7B illustrate a further embodiment of a connector of the present invention.
Figure 7B:
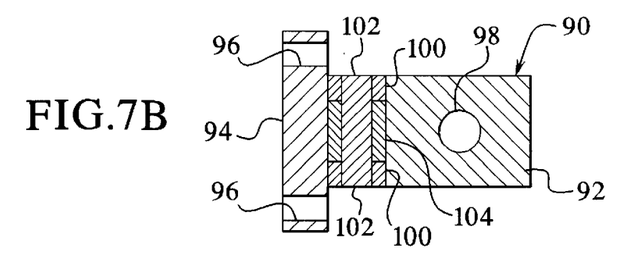

Referring now to FIGS. 7A and 7B, a further alternative connector 90 is illustrated. The FIG. 7B is a cross-section of the FIG. 7A taken along the line 7B—7B. The alternative connector 90 is similar to the alternative connector 80 of FIGS. 6A and 6B except that the alternative connector 90 is able to rotate about a center line that is parallel to the center line of the hub 12. Again, the hub 12 is shown for reference and the flat end 23 of the hub 12 is also illustrated.

The alternative flange includes a leg 92 and a mounting portion 94. The leg 92 extends radially from the hub 12. The mounting portion 94 is curved to match any curvature of the hub 12. The leg defines one or more mounting holes 98. The mounting portion 94 preferably includes at least two mounting holes 96, which mate with the outer tapped holes 26 (FIGS. 2A and 2B) formed in the hub 12.

The alternative connector 90 includes a hinge that has a plurality of hinge sections 100 that are integral to or otherwise attached to the mounting portion 94. The hinge also has at least one section 104 that is integral to or otherwise attached to the leg 92 of the alternative connector 90. The hinge sections 100 of the mounting portion 94 engage the hinge section 104 of the leg 92. The leg 92 is thereby able to rotate relative to the mounting portion 94 when the hinge section 104 of the leg 92 rotates in between the hinge sections 100 of the mounting portion 94.

A pin 102 or other suitable linking mechanism is inserted into apertures defined by the hinge sections 100 and the hinge section 104. The pin includes suitable capping devices that maintain the pin within the sections 100 and 104. The pin may also have suitable impregnated lubrication or be externally lubricated before being inserted into the hinge sections. Although not illustrated, the hinge sections can include a locking mechanism which locks the leg into a certain angle relative to the mounting portion 94 and the hub 12.

The alternative connector 90 may be used, again, to couple any of the straight tubes 20a to 20l. In an alternative embodiment, the leg 92 may be bent and thereby couple any of the radially connected members to hubs 12a to 12h.

Figure 8A:
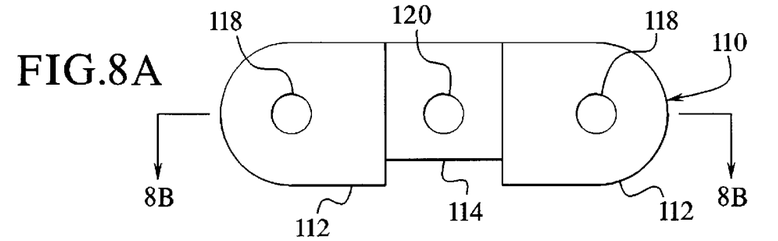
FIGS. 8A and 8B illustrate another embodiment of a flange of the present invention.
Figure 8B:
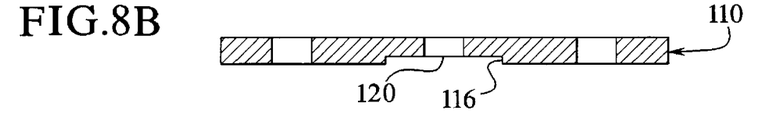

Referring now to FIGS. 8A and 8B, an alternative flange 100 is illustrated. The FIG. 8B is a cross-section of the FIG. 8A taken through the line 8B—8B. The alternative flange 110 includes outer portions 112 and an inner portion 114. The outer portions 112 each define a mounting hole 118 that enables an adapter to be mounted to the flange 100. The inner portion 114 defines a hole 120 that enables the alternative flange 110 to mount to one of the alternative connectors 80 or 90 described above. Although the alternative flange 110 includes two outer portions 112, it should be appreciated that the alternative flange 110 could simply provide one outer portion 112.

As illustrated, the inner portion 114 of the alternative flange 110 defines a notch 116. The notch 116 keeps the alternative flange 110 from rotating about a single screw or bolt through the mounting hole 120 when the alternative flange 110 mounts to one of the legs 82 or 92 of the alternative connectors 80 or 90, respectively. In an alternative embodiment, a plurality of mounting holes 120 may be offset in the inner portion 114 to keep the flange 110 from rotating relative to one of the connectors 80 or 90.

It should be appreciated that any of the alternative members described in FIGS. 6A, 6B, 7A, 7B, 8A and 8B are adaptable to be made from metal, plastic or wood as described above. Furthermore, as in the case of the alternative connectors 80 and 90, the legs 82 and 92 and the mounting portions 84 and 94 may be integrally formed or may be welded through any process known by those of skill in the art. The alternative flange 100 may be used, for example, to connect the cross-braces 20a to 20f to the horizontal straight tubes 20h clockwise to 20g respectively in FIG. 1.

Figure 9:
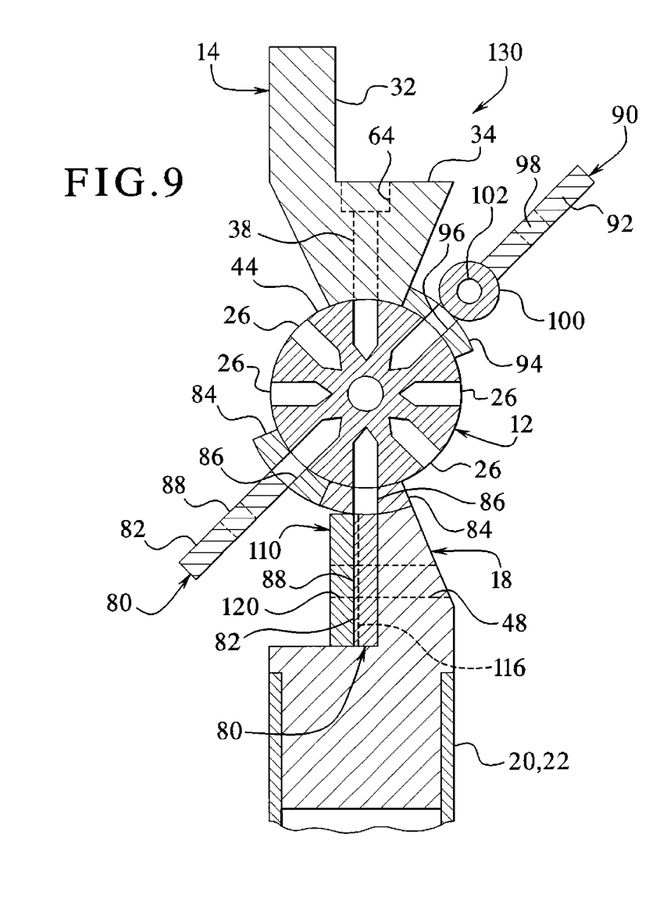
FIG. 9 illustrates another embodiment of a hub and connector sub-assembly of the present invention.

Referring now to FIG. 9, one embodiment of a subassembly 130 having alternative connectors 80/90 and the alternative flange 110 is illustrated. FIG. 9 is a cross-section taken through an elevation of the constituent members of the subassembly 130, wherein the sections are chosen to show the mounting holes of the connectors and the tapped holes 26. That is, the hub 12 is sectioned to show the tapped holes 26 that align with the various mounting holes of the alternative connectors 80 and 90. For this reason, the through-hole 38 and the counterbore 64 of the connector 14, which aligns with the inner tapped holes 24 illustrated in FIGS. 2A and 2B are shown by hidden lines. Similarly, the mounting holes 88 and 98 contained in the middle of the legs of the alternative connectors 80 and 90, respectively, are also shown as hidden lines.

The sub-assembly 130 shows the hub 12 connected to a plurality of different types of connectors. The connector 14 discussed above attaches as one of the spokes of the hub 12 through the method of attachment described above. The connector 14 includes the parallel wall 32 and the perpendicular wall 34, wherein the parallel walls 32 attaches to the flange 16 and an adapter 18 as described above. The adapter 18 in turn receives a straight tube 20 or a curved tube 22.

The hub 12 includes eight evenly spaced mounting holes 26 (or mounting hole sets), wherein the spacing is forty-five degrees. An alternative connector 80 exists one hundred thirty-five degrees counterclockwise from the connector 14. The alternative connector 80 includes the leg portion 82 and mounting portion 84, wherein the portion 84 is curved to match the curved surface 44 of the hub 12. The alternative connector 80 defines mounting holes 86 that align with outer tapped holes 26 in the hub 12. The leg portion 82 of the alternative connector 80 defines a mounting hole 88 that may attach to an adapter 18, to an alternative flange 110 or both.

Another alternative connector 80 exists forty-five degrees counter clockwise from the alternative connector 80. The second alternative connector 80 is shown attached to an adapter 18 and an alternative flange 110. The adapter 18 defines a mounting hole 48 that aligns with the mounting hole 88 defined by the leg 82 of the alternative connector 80 and the mounting hole 120 defined by the inner portion 114 of the alternative flange 110. Either the hole 48 or the hole 120 may be tapped so that no external nut is required to attach the three members. Alternatively, a suitable nut or lock-nut may be used in combination with a screw or bolt. The second alternative connector 80 attaches via the mounting portion 84 to the hub 12 by screws that extend through the through-holes 86, defined by the mounting portion 84, wherein the screws engage outer-tapped holes 26 defined by the hub 12. Either of the alternative connectors 80 may be curved.

Either a straight tube 20 or a curved tube 22 is illustrated connected to one end of the adapter 18 which may itself alternatively be curved. The tube 20 or 22 may be removably fixed to the adapter 18 via a screw or fixed to the adapter via crimping or by a continuous or intermittent weldmont.

One hundred thirty-five degrees counterclockwise from the second alternative connector 80 is an alternative connector 90. As described above, the leg portion 92 of the alternative connector 90 may rotate about a pin 102 which is inserted through a plurality of pin sections 100 that fix to or are integral with the mounting portion 94 of the alternative connector 90. The pin also inserts through a middle hinge section 104 that is integral to or attaches to the leg 92 of the alternative connector 90. The alternative connector 90 attaches to the connector 14 at a point such that rotation of the leg 92 is limited in the counterclockwise direction by the connector 14. The alternative connector 90 may likewise connect to an adapter 18 and/or an alternative flange 110 or may be curved.

It should be appreciated from the sub-assembly 130 that the alternative flange 110 mounts to the outside of the alternative connectors 80 or 90. This is different than the above described embodiments wherein the flange 16 mounts between the connector 14 and the adapter 18. It should also be appreciated, however, that the same adapter 18 may be used with either the connector 14 or the alternative connectors 80 or 90.

Figure 10:
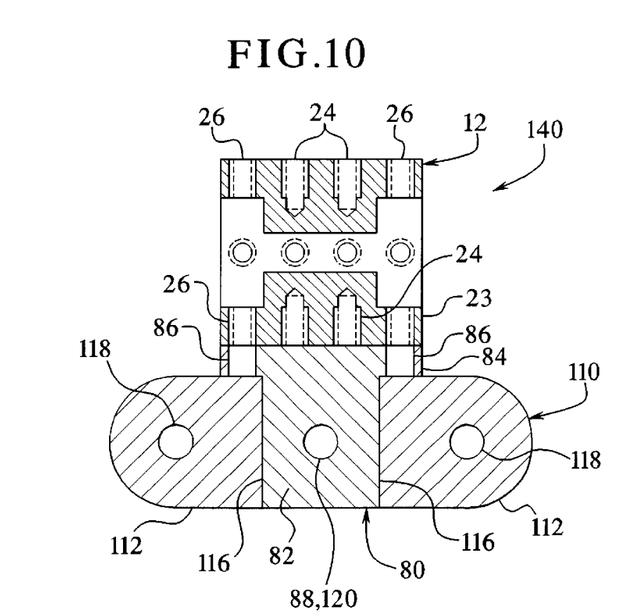
FIG. 10 illustrates a further embodiment of a hub, connector and flange subassembly of the present invention.

Referring now to FIG. 10, a sub-assembly 140 is illustrated. The subassembly 140 illustrates the alternative flange 110 mounted to an alternative connector 80, wherein the connector 80 mounts to the hub 12. The view of the hub 12 in FIG. 10 is a section of the hub 12 of FIG. 9 as viewed from the top. FIG. 10 shows both the inner tapped holes 24 and the outer tapped holes 26 of the hub 12. As described above, the alternative connector 80 in one embodiment includes mounting holes 86 that align with the outer tapped holes 26 of the hub 12.

The leg 82 of the alternative connector 80 defines the hole 88, which aligns with the hole 120 defined by the inner portion 114 of the alternative flange 110. When only one mounting hole is employed, the alternative flange 110 preferably includes a notch 116 which fits snugly and at least partially over the thickness of the alternative flange 80 so that the flange 110 cannot rotate relative to the connector 80 or 90. That is, the flange 110 firmly fixes to the connector 80 or 90 and provides a stable support for any tubes 20 or 22 that extend from adapters 18 connected to the outer portions 112 of the flange 110. As illustrated, the outer portions 112 each define a mounting hole 118 which mounts to the adapter 18, wherein the adapter 18 in turn removably or permanently receives a straight tube 20 or curved tube 22.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A structural tubing assembly comprising:
   a hub;
   a connector that couples to the hub, the connector having a first end that couples to the hub and a second end that abuts and couples to a first member; and
   a second member abutting one of the connector and the first member, the second member coupled to the connector and the first member, the second member sized to receive a tube and adapted to be removable, when coupled to the tube, from the connector without uncoupling the connector from the hub.

2. The structural tubing assembly of claim 1, which includes a plurality of the connectors attached to the hub.

3. The structural tubing assembly of claim 2, wherein the hub defines a plurality of apertures that enable the plurality of connectors to be removably attached to the hub.

4. The structural tubing assembly of claim 1, wherein the second member rotatably couples to the connector and the first member.

5. The structural tubing assembly of claim 1, wherein the first member has a portion that extends perpendicularly from the connector.

6. The structural tubing assembly of claim 5, wherein the portion couples to a third member.

7. The structural tubing assembly of claim 6, wherein the third member is sized to receive a tube.

8. The structural tubing assembly of claim 5, wherein the portion rotatably couples to a third member.

9. The structural tubing assembly of claim 8, wherein the third member is sized to receive a curved tube.

10. The structural tubing assembly of claim 1, wherein the first member has a first portion that extends perpendicularly from one side of the connector and a second portion that extends perpendicularly from another side of the connector.

11. The structural tubing assembly of claim 10, wherein the first portion couples to a third member and the second portion couples to a fourth member.

12. The structural tubing assembly of claim 11, wherein the third and fourth members are each sized to receive a tube.

13. The structural tubing assembly of claim 1, wherein at least one of the connector and the first and second members is curved.

14. The structural tubing assembly of claim 1, wherein at least one of the connector and the first and second members is curved and adapted to receive one of a horizontally disposed curved tube and a vertically disposed curved tube.

15. The structural tubing assembly of claim 1, wherein the tube is curved.

16. The structural tubing assembly of claim 1, wherein the hub has a curved surface and two opposing flat ends, and the curved surface and at least one of the flat ends are individually adapted to couple to a tube.

17. A structural tubing assembly comprising:
   a hub;
   a connector that couples to the hub, the connector having a first end that couples to the hub and a second end that abuts and couples to a flange; and
   an adapter abutting one of the connector and the flange, the adapter coupled to the connector and the flange, the adapter sized to receive a tube and adapted to be removable, when coupled to the tube, from the connector without uncoupling the connector from the hub.

18. The structural tubing assembly of claim 17, wherein the flange extends perpendicularly from the connector.

19. The structural tubing assembly of claim 18, wherein the adapter is a first adapter and the flange couples to a second adapter, the second adapter sized to receive a tube.

20. The structural tubing assembly of claim 17, wherein at least one of the connector, the flange and the adapter is curved.

21. The structural tubing assembly of claim 17, wherein at least one of the connector, the flange and the adapter is curved and adapted to receive one of a horizontally disposed curved tube and a vertically disposed curved tube.

22. The structural tubing assembly of claim 17, wherein the hub has a curved surface and two opposing flat ends, and the curved surface and at least one of the flat ends are individually adapted to couple to a tube.

23. A structural tubing assembly comprising:

a hub;

a connector coupled to the hub, the connector having an end defining a notch; and a member having a first end that defines a mating notch, the first end mated with the notched end of the connector, the member having a second end configured and arranged to receive a tube, the member and the tube coupled removably to the connector from a direction lateral to a centerline extending through the connector to the hub, and wherein the member is a first member and which includes a second member coupled to at least one of the connector and the first member, the second member coupled to cross-bracing.

24. The assembly of claim 23, wherein the member is a first member, the first end of the first member and the notched end of the connector coupled to a second member, wherein widths of the first end, notched end and second member are sized so that the widths collectively and substantially equal an inner diameter of the tube.

25. The assembly of claim 23, wherein the connector defines an aperture extending from the notched end through an end of the connector coupled to the hub, the aperture enabling the connector to be removably coupled to the hub.

26. The assembly of claim 23, wherein the notched end of the connector is adaptable to be made at a plurality of different angles relative to a centerline of the connector, so that the coupled member extends selectively at one of the plurality of different angles from the centerline of the connector.

27. The assembly of claim 23, wherein the notched end of the connector is curved.

28. The assembly of claim 23, wherein the connector includes an end defining a taper that enables a plurality of like-tapered connectors to be coupled simultaneously to the hub.

29. A connector for coupling to a hub in a structural tubing assembly, the connector comprising:

a mounting portion having a face shaped to mate with an external surface of the hub, the mounting portion tapered to enable a plurality of like-tapered connectors to be coupled simultaneously to the hub; and a leg that extends from a notched end of the mounting portion, the width of the leg sized to enable a separate member to couple to the leg so that a combined width of the leg and the member is substantially equal to or less than an inner diameter of a tube received by the separate member, the leg defining an aperture with which to mount the member, with the tube connected thereto, to the leg from a direction that is lateral with respect to a centerline extending through the tapered portion to the hub, and wherein the mounting portion defines an aperture extending from the notched end, through the mounting portion to the shaped face, the aperture enabling the connector to be removably coupled to the hub from the notched end.

30. The connector of claim 29, wherein the mounting portion is configured so that it is mountable in multiple orientations to the hub.

31. The connector of claim 29, wherein the leg is rotatable relative to the tapered mounting portion.

32. The connector of claim 29, wherein the leg is curved.

33. The connector of claim 29, which is metal, plastic or wood.

* * * * *